(12) United States Patent
Sun et al.

(10) Patent No.: US 10,160,879 B2
(45) Date of Patent: Dec. 25, 2018

(54) AQUEOUS LATEX AND DISPERSION OF INORGANIC PIGMENT PARTICLES COMPRISING THE SAME

(71) Applicant: SWIMC LLC, Cleveland, OH (US)

(72) Inventors: Jianping Sun, Foshan (CN); Tao Wang, Foshan (CN); Gang Duan, Northbrook, IL (US); Xi Zhao, Foshan (CN); Rong Xiong, Foshan (CN)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 15/133,495

(22) Filed: Apr. 20, 2016

(65) Prior Publication Data

US 2016/0280952 A1 Sep. 29, 2016

Related U.S. Application Data

(63) Continuation of application No. PCT/US2014/058013, filed on Sep. 29, 2014.

(30) Foreign Application Priority Data

Oct. 28, 2013 (CN) .......................... 2013 1 0518250

(51) Int. Cl.
| | | |
|---|---|---|
| *C09D 125/14* | (2006.01) | |
| *C08F 2/22* | (2006.01) | |
| *C08F 220/36* | (2006.01) | |
| *C08F 230/02* | (2006.01) | |
| *C08F 212/08* | (2006.01) | |
| *C08K 3/22* | (2006.01) | |

(52) U.S. Cl.
CPC .............. *C09D 125/14* (2013.01); *C08F 2/22* (2013.01); *C08F 212/08* (2013.01); *C08F 220/36* (2013.01); *C08F 230/02* (2013.01); *C08K 2003/2241* (2013.01)

(58) Field of Classification Search
CPC ................ C09D 125/14; C08F 212/08; C08K 2003/2241
USPC ....................................................... 524/460
See application file for complete search history.

(56) References Cited

U.S. PATENT DOCUMENTS

| | | |
|---|---|---|
| 4,624,762 A | 11/1986 | Abbey et al. |
| 4,750,940 A | 6/1988 | Higashi et al. |
| 5,385,960 A | 1/1995 | Emmons et al. |
| 5,981,624 A | 11/1999 | Thetford et al. |
| 6,080,802 A | 6/2000 | Emmons et al. |
| 6,197,879 B1 | 3/2001 | Fischer et al. |
| 6,642,338 B2 | 11/2003 | Ramesh et al. |
| 7,273,842 B1 | 9/2007 | VanDyk et al. |
| 7,417,102 B2 | 8/2008 | Ohrbom et al. |
| 7,964,660 B2 | 6/2011 | Matsumoto et al. |
| 8,349,981 B2 | 1/2013 | Fechner et al. |
| 8,765,348 B2 | 7/2014 | Ganapathiappan et al. |
| 2007/0208129 A1* | 9/2007 | Finegan ................ C08F 220/18 524/497 |
| 2007/0255008 A1 | 11/2007 | Elder et al. |
| 2008/0051500 A1 | 2/2008 | Wiese |
| 2008/0085950 A1 | 4/2008 | Ganapathiappan et al. |
| 2008/0269402 A1* | 10/2008 | Maurice ................ C08F 220/14 524/547 |
| 2008/0293874 A1 | 11/2008 | Schrod et al. |
| 2009/0234062 A1 | 9/2009 | Kok et al. |
| 2010/0183540 A1 | 7/2010 | Dahling |
| 2011/0152428 A1 | 6/2011 | Imaya et al. |
| 2011/0184097 A1 | 7/2011 | Fechner et al. |
| 2012/0123029 A1 | 5/2012 | Laufer et al. |
| 2015/0232685 A1* | 8/2015 | Wang ................ C09D 133/064 523/205 |

FOREIGN PATENT DOCUMENTS

| | | |
|---|---|---|
| EP | 0615534 | 4/1997 |
| EP | 0801173 | 10/1997 |
| EP | 1975206 | 1/2008 |
| WO | 93/12183 | 6/1993 |
| WO | 9701602 | 1/1997 |
| WO | 9701603 | 1/1997 |

OTHER PUBLICATIONS

International Search Report and Written Opinion for International Application No. PCT/US2014/058013, dated Jan. 9, 2015. (13 pages).

* cited by examiner

*Primary Examiner* — Hui H Chin
(74) *Attorney, Agent, or Firm* — Patterson Thuente Pedersen, P.A.

(57) ABSTRACT

The present disclosure relates to an aqueous latex and a process for the preparation thereof. In particular, the present disclosure relates to an aqueous latex useful as a spacing extender for inorganic pigment particles. The present disclosure also relates to a dispersion of inorganic pigment particles comprising the aqueous latex and to an aqueous coating composition comprising the aqueous latex and inorganic pigment particles.

22 Claims, 1 Drawing Sheet

Fig. 1
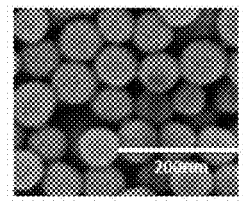
Fig. 2
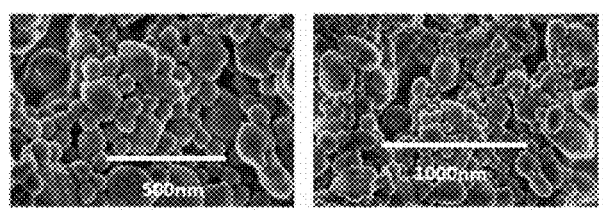
Fig. 2 (a)   Fig. 2 (b)
Fig. 3
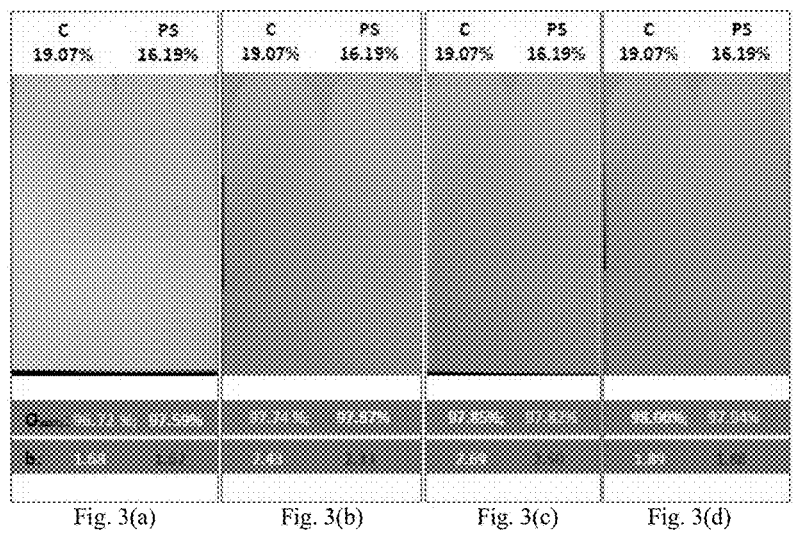
Fig. 3(a)   Fig. 3(b)   Fig. 3(c)   Fig. 3(d)

AQUEOUS LATEX AND DISPERSION OF INORGANIC PIGMENT PARTICLES COMPRISING THE SAME

CROSS-REFERENCE TO RELATED APPLICATION(S)

This application is a continuation of International Application No. PCT/US2014/058013 filed 29 Sep. 2014, which claims priority from Chinese Patent Application No. 201310518250.X, filed 28 Oct. 2013, the disclosure of each is incorporated herein by reference in its entirety.

TECHNICAL FIELD

The present disclosure relates to an aqueous latex and a process for the preparation thereof. In particular, the present disclosure relates to an aqueous latex useful as a spacing extender for inorganic pigment particles. The present disclosure also relates to a dispersion of inorganic pigment particles comprising the aqueous latex and to an aqueous coating composition comprising the aqueous latex and inorganic pigment particles.

BACKGROUND

Inorganic pigment particles (in particular titanium dioxide particles) have been widely used in various applications including coating, ink, paint, stain, and so on. For example, titanium dioxide particles are added as the pigment to coating compositions, serving to provide the coatings formed therefrom with opacity to enhance hiding power thereof Titanium dioxide particles that are used as pigment typically have a relatively small particle size, e.g., in order of micrometers or even nanometers. Using such small particles often presents a problem that the particles are prone to aggregate during their mixing and dispersing. Aggregation of particles degrades the scattering performance thereof and hence the opacity of the coating. To reduce the aggregation of inorganic pigment particles, U.S. Pat. No. 5,385,960 discloses a process for spacing inorganic pigment particles (e.g., titanium dioxide particles) by using polymeric latex particles. It is described in the process that a dispersion of titanium dioxide in an aqueous medium is mixed with a dispersion of polymeric particles, whereby the polymeric particles are adsorbed onto the titanium dioxide particles to serve to space the titanium dioxide particles from each other. However, the thus-formed composite and as well coating compositions comprising such composite have a problem that the viscosity thereof is increasing over time. To solve this problem, the solution has been proposed that an effective amount of small-molecule dihydrogen phosphate salt is incorporated therein to suppress the constant increase of the viscosity. However, such additional incorporation of a small molecule substance presents many problems, such as environmental problem, bleeding out of small molecules, and so on.

Additionally, titanium dioxide particles used as pigment, especially titanium dioxide particles having the optimum particle size and particle size distribution for light scattering are usually one of the most expensive ingredients in the formulation of coating compositions. Therefore, there is a constant need for minimizing the amount of titanium dioxide particles used in coating compositions while the resultant coatings can still obtain the desirable opacity. To this end, the dispersibility of titanium dioxide particles in coatings needs to be improved to reduce aggregation of the titanium dioxide particles.

Therefore, the coating industry still has a need for an improved aqueous latex useful for spacing inorganic pigment particles (especially titanium dioxide particles).

SUMMARY

In one aspect, the present disclosure provides an aqueous dispersion of polymeric particles prepared through emulsion polymerization using monomers comprising:

i) 0.1 to 20% by weight of at least one ethylenically unsaturated monomer containing an anchor functionality and a moiety containing poly(oxyethylene);

ii) 0 to 20% by weight of at least one ethylenically unsaturated monomer with a carboxylic acid functionality; and iii) 60 to 99.9% by weight of at least one ethylenically unsaturated monomer other than monomers i) and ii), wherein the weight % is relative to the total weight of the monomers i), ii) and iii); and wherein the polymeric particles have a glass transition temperature of at least 50° C.

In embodiments of the present disclosure, the ethylenically unsaturated monomer i) has a structure represented by formula (I):

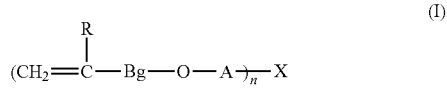

(I)

in which,

R represents H or methyl; Bg represents a divalent bridged group of —CO— or —CHR'— wherein R' represents H or methyl; A represents —(CH$_2$CH$_2$O)$_r$—, in which r represents a value in the range of 1 to 54 or —(CH$_2$CH$_2$O)$_p$(C$_y$H$_{2y}$O)$_q$—, in which the structural units are connected with each other in arbitrary order, the subscripts p and q represent the statistic sum of the corresponding structural units in the range of 1 to 54 with the ratio of p to q being in the range of 1:1 to 10:1 and y represents an integer in the range of 3 to 8; X represents an anchor functionality; and n is 1 or 2. Preferably, A presents —(CH$_2$CH$_2$O)$_r$—, in which r represents a value in the range of 1 to 54. Preferably, the anchor functionality is selected from the group consisting of phosphoric acid functionality, phosphate salt functionality, ammonium salt functionality, amine functionality and hydroxyl functionality.

In another aspect, the present disclosure provides a process for the preparation of an aqueous dispersion of polymeric particles comprising carrying out an emulsion polymerization of the above-described monomers in the presence of an emulsifier and a radical initiator to produce the aqueous dispersion of polymeric particles, wherein the polymeric particles have a glass transition temperature of at least 50° C.

In still another aspect, the present disclosure provides a dispersion of inorganic pigment particles comprising inorganic pigment particles, an aqueous dispersion of polymeric particles according to the present disclosure, and a dispersion medium.

In yet still another aspect, the present disclosure provides an aqueous coating composition comprising water, a film-forming amount of a film-forming resin, inorganic pigment particles, a spacing extender for the inorganic pigment particles; and conventional additives, wherein the spacing extender is any aqueous dispersion of polymeric particles according to the present disclosure. Preferably, the coating composition has a substantially stable viscosity after storage at 50° C. for at least one month.

When the aqueous dispersion according to the present disclosure is mixed with the inorganic pigment particles, the polymeric particles contained in the aqueous dispersion are anchored to the inorganic pigment particles via the anchoring functional groups to serve to spatially separate and stabilize the inorganic pigment particles. Therefore, the aqueous dispersion according to present disclosure can prevent the inorganic pigment particles, in particular titanium dioxide particles, from aggregation, and render better dispersibility of the pigment particles in a dispersion medium. As a result, as compared with a coating formed from a comparable coating composition that does not contain the aqueous dispersion of polymeric particles according to the present disclosure, a coating formed from an aqueous coating composition according to the present disclosure exhibits higher opacity and/or lower b value at the same amount of inorganic pigment particles, or exhibits substantially the same or even higher opacity and/or the same or even lower b value at a lower amount of inorganic pigment particles. Additionally, the inorganic pigment particles spaced with the aqueous dispersion of polymeric particles according to the present disclosure exhibit an improved stability, especially an improved stability of viscosity.

The details of one or more embodiments of the invention will be set forth in the description below. The other features, objectives, and advantages of the invention will become apparent.

BRIEF DESCRIPTION OF DRAWINGS

FIG. 1 shows the photograph of polymeric particles of the aqueous dispersion according to the present disclosure taken by Scanning Electron Microscope.

FIG. 2 shows the photograph of a dispersion of $TiO_2$ particles spaced with the aqueous dispersion according to the present disclosure taken by Scanning Electron Microscope. FIG. 2(a) and FIG. 2(b) show the photographs at the different magnifications, respectively.

FIG. 3 shows the photographs of coatings according to the examples and the comparative experiments of the present disclosure taken by a BYK color spectrophotometer, with the left side of each photograph taken from the comparative experiment and right side of each photograph from the example. In FIGS. 3a) to 3d), the commercially available titanium dioxide powder products R-706 from DuPont; R-298 from Pangang Group Steel Co., Ltd, China; SR-237 from Shandong Dongjia Group Co., Ltd, China; and R-838 from BlueStar Group (CHINA) Co., Ltd, China are used as the inorganic pigment particles, respectively.

DETAILED DESCRIPTION

As used herein, the term "an aqueous latex" refers to a stable dispersion of polymeric particles in an aqueous liquid medium with the aid of, if necessary, an emulsifier or a dispersion stabilizer such as surfactant. Unless expressly indicated otherwise, the terms "aqueous latex" and "aqueous dispersion", when used herein in the context of polymer, can be interchangeably used.

As used herein, the term "an anchor functionality" refers to any functional group that is capable of strongly interacting with the surface of inorganic pigment particles, preferably forming an ionic bond, a covalent bond, or a hydrogen bond with a group or an atom on the surface of inorganic pigment particles. Via such a functional group, the polymeric particles are bound to the surface of inorganic pigment particles.

As used with respect to an aqueous coating composition, the phrase "substantially stable viscosity" refers to the viscosity of the aqueous coating composition increases by less than 5%, preferably less than 2%, and more preferably less than 1% after storage for at least one month at 50° C.

As used with respect to a coating, the term "opacity" refers to the ratio of the intensity of visible light that impinges on the coating to the intensity of said visible light that transmits through the coating, which is the measurement of the ability of a coating to absorb visible light.

As used with respect to a coating, "b-value" denotes the blue-yellow color component in CIE Lab color space of the coating. Typically, the lower the b-value, the bluer the coating, while the higher the b-value, the more yellow the coating. When evaluated by naked eyes, a coating with a lower b-value will be regarded as to be whiter in color.

Throughout the present disclosure, where a composition or a chemical moiety is described as having, including, or comprising specific components or fractions, it is contemplated that the composition or chemical moiety as disclosed herein may further comprise other components or fractions, whether or not specifically mentioned in this disclosure, but it is also contemplated that the composition or chemical moiety may consist essentially of, or consist of, the recited components. Also where a process is described as having, including, or comprising specific process steps, it is contemplated that the process as disclosed herein may further comprise other process steps, whether or not specifically mentioned in this disclosure, but it is also contemplated that the process may consist essentially of, or consist of, the recited steps.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a", "an", "the", "at least one", and "one or more" are used interchangeably. Thus, for example, a coating composition that comprises "an" additional additive can be interpreted to mean that the coating composition includes "one or more" additional additives.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Aqueous Latex

According to one aspect of the present disclosure, an aqueous latex or an aqueous dispersion of polymeric particles is prepared through emulsion polymerization using monomers comprising: i) 0.1 to 20% by weight of at least one ethylenically unsaturated monomer containing an anchor functionality and a moiety containing poly(oxyethylene); ii) 0 to 20% by weight of at least one ethylenically unsaturated monomer with a carboxylic acid functionality; and iii) 60 to 99.9% by weight of at least one ethylenically unsaturated monomer other than monomers i) and ii), wherein the weight % is relative to the total weight of the monomers i), ii) and iii); and wherein the polymeric particles have a glass transition temperature (Tg) of at least 50° C.

As used herein, "Tg" denotes a glass transition temperature, at which temperature a polymer transits from a glassy state to a rubbery state, or vice versa. Tg can be experimentally determined by using, for example, the differential scanning calorimetry (DSC), or calculated by using the Fox equation. Unless indicated otherwise, the values and ranges given for Tg in the present disclosure are those calculated by using the Fox equation.

According to the Fox equation, Tg (in K) of a copolymer having n copolymerized monomers can be given by the respective weight fractions $W_i$ of the monomers and Tg (in K) of the respective homopolymers of each type of the monomers:

$$\frac{1}{Tg} = \frac{W_1}{Tg_1} + \frac{W_2}{Tg_2} + \ldots + \frac{W_n}{Tg_n}$$

Tg thus given in K can easily be converted into Tg expressed in ° C.

Without wishing to be bound by theory, the inventors think that for some embodiments of the present disclosure, Tg of the polymeric particles is one of the factors that may contribute to the stability and duration of the polymeric particles as a spacing extender for spatially separating inorganic pigment particles. In a preferred embodiment, the polymeric particles have a Tg of at least about 55° C., preferably at least about 60° C., more preferably at least about 80° C., and even more preferably at least about 90° C. On the other hand, the polymeric particles have a Tg of at most about 110° C., preferably at most about 105° C., more preferably at most about 102° C., and even more preferably at most about 100° C. The polymeric particles having a relatively high Tg is advantageous to spatially separate inorganic pigment particles. The polymeric particles having a relatively high Tg are hard (i.e., in a glassy state) when used at a room temperature or even higher, so that they can spatially separate inorganic pigment particles very well.

In an embodiment of the present disclosure, the aqueous latex has a relatively high minimum film formation temperature (MFFT). In a preferred embodiment, the aqueous latex has a MFFT of at least about 60° C., and more preferably at least about 80° C. The minimum film formation temperature (MFFT) can be determined, for example, according to ASTM D-2354-91. Also, a relatively high MFFT is advantageous to spatially separate inorganic pigment particles. The aqueous latex having a relatively high MFFT will not form a film at room temperature or even higher temperature, so that the effect of spatially separating inorganic pigment particles is not negatively affected.

In an embodiment of the present disclosure, the polymeric particles of the aqueous latex have a number-average particle size in a range of from about 30 to 150 nm, preferably from about 50 to 100 nm, more preferably from about 50 to 80 nm, most preferably from about 50 to 70 nm. The number-average particle size is measured by using Scanning Electron Microscope.

i) Ethylenically Unsaturated Monomer Containing an Anchor Functionality and a Moiety Containing Poly(Oxyethylene)

The monomers that are used to prepare the aqueous latex according to the present disclosure comprise an ethylenically unsaturated monomer containing an anchor functionality and a moiety containing poly(oxyethylene) (hereafter referred to as "the ethylenically unsaturated monomer i)"). The ethylenically unsaturated monomer i) serves to introduce an anchor functionality in polymeric particles obtained from polymerization of the monomers. With such a functional group, the polymeric particles can be bound to the surface of inorganic pigment particles such as titanium dioxide particles, for example, via an ionic bond, a covalent bond, or a hydrogen bond.

As inorganic pigment particles, in particular titanium dioxide particles, may have different surface natures, one can select and introduce in polymeric particles different anchoring functional groups according to the surface natures of the inorganic pigment particles.

In the case where inorganic pigment particles bear ionic sites on the surface, such ionic sites can form ion pairs with the anchoring functional groups containing counter-ions. For example, when the inorganic pigment particles bear cation on the surface, the anchoring functional groups bearing anion can be anchored to the surface of the particles by the formation of ion pairs. Some inorganic pigment particles bear both cation and anion on the surface. In this case, either of the anchoring functional groups bearing anion and the anchoring functional groups bearing cation can be anchored to the surface of the particles.

In the case where inorganic pigment particles have reactive functional groups on the surface, such as carboxyl, hydroxyl, amino groups or the like, such reactive functional groups can form, for example, covalent chemical bonds with anchor functional groups having the complementary reactivity to the reactive functional groups on the surface. For example, when inorganic pigment particles have hydroxyl groups on the surface, carboxyl groups can function as the anchor functional groups to be anchored to the surface.

In the case where inorganic pigment particles have no ionic sites or reactive functional groups on the surface, the inorganic pigment particles may contain on the surface the oxygen atoms and hence donor or receptor groups for a hydrogen bond such as ester, ketone, ether, hydroxyl groups or the like. In this case, the donor or receptor groups can form a hydrogen bond with the complementary anchoring groups. Although an individual hydrogen bond is weaker than other bonding, however, a plurality of donor and acceptor groups from the anchor functionality of the polymeric particles and the surface of the pigment particles can render a relatively strong interaction between the polymeric particles and the inorganic pigment particles.

Without wishing to be bound by any theory, the inventors believe that the anchor functionality introduced in the polymeric particles can anchor the polymeric particles to inorganic pigment particles, so that the polymeric particles function to spatially separate and stabilize the inorganic pigment particles.

Under the above-indicated framework, as the anchor functionality, any functional group that has a strong interaction with the surface of inorganic pigment particles, preferably forms an ionic bond, a covalent bond, or a hydrogen bond with groups or atoms on the surface of inorganic pigment particles can be selected. In a preferred embodiment of the present disclosure, the anchor functionality is selected from the group consisting of phosphoric acid, phosphate, ammonium salts, amine, and hydroxyl groups.

In an embodiment of the present disclosure, because of bearing the anchor functionality, the polymeric particles of the aqueous latex can be firmly bound to the surface of inorganic pigment particles, thereby enwrapping and spatially separating the inorganic pigment particles. The inorganic pigment particles separated by the polymeric particles can be stably dispersed in the dispersion with reduced aggregation or agglomeration. As a result, coatings formed from coating compositions comprising the inorganic pigment particles separated by the polymeric particles exhibit better properties, including optical properties such as the opacity and the b value.

The ethylenically unsaturated monomer i) further contains a moiety containing poly(oxyethylene). The presence of a moiety containing poly(oxyethylene) provides an aqueous latex of polymeric particles formed therefrom and also compositions comprising the polymeric particles and inorganic pigment particles with the prolonged stability. The prolonged stability is measured as the substantially stable viscosity of the compositions comprising the polymeric particles and inorganic pigment particles after storage at 50° C. for at least one month or even three months.

Without wishing to be bound by any theory, the moiety containing poly(oxyethylene) is hydrophilic. Such a hydrophilic moiety which is present on the surface of polymeric particles can function as a non-ionic surface active component, so that the aqueous latex containing the moiety and the compositions comprising the aqueous latex and inorganic pigment particles can have the prolonged stability, in particular the stability of viscosity at an elevated temperature. Preferably, the moiety containing poly(oxyethylene) is derived from hydrophilic poly(alkylene glycol) ether or copolymer thereof, such as poly(ethylene glycol) ether and hydrophilic poly(ethylene glycol)-co-($C_3$-$C_8$ glycol) ether, e.g., poly(ethylene glycol)-co-(propylene glycol) ether, poly(ethylene glycol)-co-(butylene glycol) ether, poly(ethylene glycol)-co-(pentylene glycol) ether, poly(ethylene glycol)-co-(hexylene glycol) ether, and poly(ethylene glycol)-co-(octylene glycol) ether. Most preferably, the moiety containing poly(oxyethylene) is derived from poly(ethylene glycol) ether.

In an embodiment, the ethylenically unsaturated monomer i) has the structure represented by formula (I):

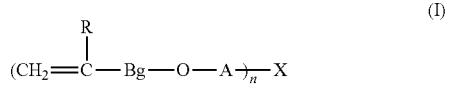

(I)

in which,
R represents H or methyl;
Bg represents a divalent bridged group of —CO— or —CHR'— wherein R' represents H or methyl;

A represents —($CH_2CH_2O$)$_r$—, in which r represents a value in the range of 1 to 54 or —($CH_2CH_2O$)$_p$($C_yH_{2y}O$)$_q$—, in which the structural units are connected with each other in arbitrary order, the subscripts p and q represent the statistic sum of the corresponding structural units in the range of 1 to 54 with the ratio of p to q being in the range of 1:1 to 10:1 and y represents an integer in the range of 3 to 8; X represents an anchor functionality, and
n is 1 or 2.

In a preferred embodiment, the ethylenically unsaturated monomer i) has a structure represented by formula (I-1)

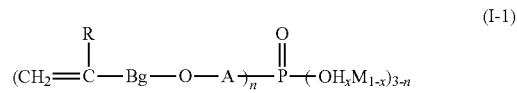

(I-1)

in which,
R, Bg, A and n are defined as above; M represents alkali metal ion; and x is at each occurrence 0 or 1.

In another preferred embodiment, the ethylenically unsaturated monomer i) has a structure represented by formula (I-2)

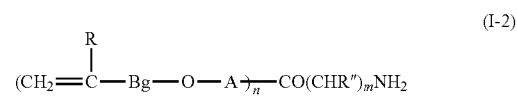

(I-2)

in which,
R, Bg, and A are defined as above; n is 1; R" represents H or $C_{1-18}$ alkyl, $C_{6-18}$ aryl, $C_{7-18}$ aralkyl or alkaryl; and m is 1, 2, or 3.

For the preparation of the aqueous latex of the present disclosure, one or more ethylenically unsaturated monomers i) as described above can be used alone or in combination. The ethylenically unsaturated monomer i) as described above can be prepared from any suitable reactant(s) by using any suitable process for the preparation. Preferably, the ethylenically unsaturated monomer i) is prepared by reacting an ethylenically unsaturated functional polyether with an anchor functionality introducing reagent. The anchor functionality introducing reagent serves to introduce an anchoring functional group or precursor thereof in the ethylenically unsaturated monomer i). In the case where an anchor functionality introducing reagent introduces a precursor of an anchoring functional group, the preparation of the ethylenically unsaturated monomer i) further comprises treating the reaction product of the anchor functionality introducing reagent and an ethylenically unsaturated functional polyether with a further reagent suitable for converting the precursor into the desired anchoring functional group. For example, in the case where an anchor functionality introducing reagent introduce an acidic precursor of an anchoring functional group, a suitable base, preferably an inorganic base (e.g., an alkali metal hydroxide such as sodium hydroxide, potassium hydroxide, and lithium hydroxide), is selected to neutralize the precursor to result in the desired anchoring functional group.

In an embodiment of the present disclosure, the ethylenically unsaturated functional polyether may be an allyl-functional polyether or a (meth)acryl-functional polyether. These ethylenically unsaturated functional polyethers may be a commercially available product, or may be prepared by a suitable method well known in the art. For example, an acryl-functional polyether can be prepared by reacting an acrylic acid with a suitable polyether such as PEO 2000 under suitable conditions.

In order to prepare the ethylenically unsaturated monomer i) containing an anchor functionality, a phosphating agent, an aminating agent, or any other agent suitable for introducing an anchor functionality. Such an agent may be commercially available, or may be synthesized by using a suitable process known in the art. In an embodiment, phosphorus oxychloride, phosphorus pentoxide, polyphosphoric acid, pyrophosphoric acid or acetyl phosphate can be used as an example of a phosphating agent. Additional examples can be found in German Patent Application No. DE-A 2,726, 854. Phosphorus pentoxide, polyphosphoric acid and pyrophosphoric acid are the preferred phosphating agent, and amongst them, phosphorus pentoxide is the most preferred. In some embodiments, ethyl glycinate hydrochloride is used as an example of the aminating agent.

The conditions for the synthesis of the above-indicated ethylenically unsaturated monomer i) can readily be determined by a person skilled in the art. Preferably, the ethylenically unsaturated monomer i) can be synthesized by reacting an ethylenically unsaturated functional polyether with a suitable reagent such as phosphorus pentoxide or ethyl glycinate hydrochloride in the presence of an effective amount of a polymerization inhibitor and optionally a catalyst, followed by neutralization with an inorganic base such as sodium hydroxide.

In order to provide the surface of polymeric particles with anchoring functional groups at a desirable amount, the amount of the ethylenically unsaturated monomer i) used is, relative to the total weight of all the monomers used in the preparation of the aqueous latex, in the range of from 0.1 to 20% by weight, preferably from 0.1 to 15% by weight, more preferably from 0.2 to 10% by weight, even more preferably from 0.5 to 10% by weight, and in particular from 1 to 5% by weight.

ii) Ethylenically Unsaturated Monomer with a Carboxylic Acid Functionality

To prepare the aqueous latex useful to space inorganic pigment particles, in particular titanium dioxide particles, according to the present disclosure, optionally an ethylenically unsaturated monomer with a carboxylic acid functionality ("an ethylenically unsaturated monomer ii)") may be used. Presence of such an ethylenically unsaturated monomer ii) can additionally improve the stability of the aqueous latex. The examples of the ethylenically unsaturated monomer ii) comprise acrylic acid, methacrylic acid, beta-acryloxy propionic acid, ethacrylic acid, alpha-chloroacrylic acid, crotonic acid, alpha-phenylacrylic acid, cinnamic acid, chlorocinnamic acid, itaconic acid, maleic acid, and the combination thereof. Preferably, acrylic acid is used as the example of the ethylenically unsaturated monomer ii).

In order to provide the stable aqueous latex, the amount of the ethylenically unsaturated monomer ii) used is, relative to the total weight of all the monomers used in the preparation of the aqueous latex, in the range of from 0 to 20% by weight, preferably from 0.2 to 10% by weight, more preferably from 0.2 to 5% by weight, still more preferably from 0.2 to 3% by weight, and in particular from 0.2 to 1% by weight. A relatively low amount of the ethylenically unsaturated monomer ii) used is advantageous to obtain a stable aqueous latex. Therefore, the amount of the ethylenically unsaturated monomer ii) used is, relative to the total weight of all the monomers used in the preparation of the aqueous latex, optimally in the range of from 0.5 to 1% by weight.

iii) Ethylenically Unsaturated Monomer Other than Monomers i) and ii)

The monomers used to prepare the aqueous latex according to the present disclosure further comprises at least one ethylenically unsaturated monomer other than monomers i) and ii) (hereafter referred to as "the ethylenically unsaturated monomer iii)"). The ethylenically unsaturated monomer iii) suitably used in the present disclosure may comprise any ethylenically unsaturated compound that is radically polymerisable, except the ethylenically unsaturated monomers i) and ii). Suitable examples of the ethylenically unsaturated monomer iii) comprise styrenes such as styrene, alpha-methylstyrene, vinyltoluene, vinylnaphthalene, alkenyl halides such as vinyl chloride, vinylidene chloride, vinyl fluoride, tetrafluoroethylene, hexafluoropropylene, allyl ethers such as allyl benzyl ether, vinyl acetate, vinyl versarates such as those vinyl versarates commercially available under trade name VeoVa™ (e.g., VeoVa™ 10), acrylonitriles suc as acrylonitrile, methacrylonitrile, $C_{1-20}$ alkyl esters of (meth)acrylic acid, alkoxyalkyl (meth)acrylate, and the combination thereof To obtain the polymeric particles with the desirable Tg, incorporation of the ethylenically unsaturated monomer iii) is of importance. Preferably, styrenes, alkyl (meth)acrylates, or combination thereof are selected as the ethylenically unsaturated monomer iii) to meet the requirements of application as indicated above. More preferably, styrenes, $C_{1-20}$ alkyl esters of (meth)acrylic acid, or combination thereof are used. Suitable examples of $C_{1-20}$ alkyl esters of (meth) acrylic acid include, but not limited to, methyl (meth) acrylate, ethyl (meth)acrylate, propyl (meth)acrylate, isopropyl (meth)acrylate, butyl (meth)acrylate, isobutyl (meth) acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth) acrylate, lauryl (meth)acrylate, isobornyl (meth)acrylate, octyl (meth)acrylate, nonyl (meth)acrylate, and a mixture thereof. In an embodiment of the present disclosure, the ethylenically unsaturated monomer iii) comprises styrene, butyl acrylate, or a mixture thereof.

The amount of the ethylenically unsaturated monomer iii) used may be adjusted according to the practical demands (such as Tg, mechanical strength, and so on). In view of the practical operability and cost of production, typically the weight percentage of the ethylenically unsaturated monomer iii) in the total monomers used for the preparation of the aqueous latex is relatively high. In particular, the amount of the ethylenically unsaturated monomer iii) used is, relative to the total weight of all the monomers used in the preparation of the aqueous latex, in the range of from 60 to 99.9% by weight, preferably from 70 to 99% by weight, more preferably from 80 to 98% by weight, even more preferably from 90 to 98% by weight, and in particular from 93 to 98% by weight.

Preparation of Aqueous Latex

In another aspect of the present disclosure, there is provided a process for the preparation of an aqueous dispersion of polymeric particles comprising carrying out an emulsion polymerization of monomers in the presence of an emulsifier and a radical initiator, the monomers comprising: i) 0.1 to 20% by weight of at least one ethylenically unsaturated monomer containing an anchor functionality and a moiety containing poly(oxyethylene); ii) 0 to 20% by weight of at least one ethylenically unsaturated monomer with a carboxylic acid functionality; and iii) 60 to 99.9% by weight of at least one ethylenically unsaturated monomer other than monomers i) and ii), with the weight % being relative to the total weight of the monomers i), ii) and iii), wherein the polymeric particles have a glass transition temperature (Tg) of at least 50° C. In an embodiment of the present disclosure, the polymeric particles have a number-average particle size in the range of from 30 to 150 nm, preferably from 50 to 100 nm, and more preferably from 50 to 80 nm. The number-average particle size may be measured by using Scanning Electron Microscope.

The emulsion polymerization technology for the preparation of an aqueous latex from an ethylenically unsaturated monomer is well known in the art; here can be used any conventional emulsion polymerization process, such as a one-stage process, a multi-stage process, and a continuous process. It is well known that an aqueous latex can be prepared by using seed polymerization or by adjusting the amount of emulsifier initially added, to control the number of polymeric particles formed in the aqueous latex and/or the particle size of polymeric particles. The processes for the preparation of an aqueous latex have been generally discussed in *Emulsion Polymerization*, Wiley, N.Y., 1975 by D. C Blackley. In particular, for the preparation of an aqueous acrylic latex, one may refer to, for example, "*Emulsion Polymerization of Acrylic Polymers, Bulletin*" released by Rohm and Haas Company.

In an embodiment of the present disclosure, the aqueous latex is prepared by dispersing the polymerizable monomers in water with the aid of a suitable emulsifier under stirring to form an emulsion, and adding dropwise the thus-formed emulsion in a polymerization reactor containing an initiator to proceed with polymerization.

Any suitable radical initiator may be used to initiate the polymerization reaction. Suitable examples of the initiator include those that generate free radical species by thermal decomposition at a temperature of polymerization. The initiators may include water soluble initiators and water insoluble initiators. The specific examples of the radical initiators include persulfates, such as ammonium persulfate or alkali metal (including potassium, sodium or lithium) persulfates; peroxides, such as cumene hydroperoxide, t-butyl hydroperoxide, di-t-butyl peroxide, dioctyl peroxide, tert-butyl peroxypivalate, t-butyl perisonoanoate, t-butyl peroctoate, tert-butyl peroxyneodecanoate, bis(2-ethylhexyl) peroxydicarbonate, di-isotrydecyl peroxydicarbonate; azo compounds, such as 2,2'-azo-bis(isobutyronitrile), 2,2'-azo-bis(valeronitrile); and the conventional redox systems. Preferably, a water soluble persulfate is used as the initiator. In particular, ammonium persulfate is used as the initiator.

The polymerizable monomers' dispersing may be promoted by any suitable emulsifier. Suitable examples of the emulsifier include an anionic surfactant, a non-ionic surfactant, or a combination thereof. These surfactants are well known in the art. For example, some surfactants suitable for emulsion polymerization are disclosed in *McCutcheon's Detergents and Emulsifiers*, by Glen Rock, N.J., MC Publishing Co. Other types of stabilizer such as a protective colloid may also be used. Preferably, a combination of an anionic surfactant and a non-ionic surfactant is used. The anionic surfactant includes aliphatic carboxylate salts, aliphatic sulfonate salts, aliphatic sulfate salts, and aliphatic phosphate salts. Preferably, the salts of alkali metal such as Na, K, and Li, or alkali earth metal such as Ca and Ba may be used. In a specific example of the present disclosure, an aliphatic sulfonate salt, preferably alkali metal dodecyl sulfonate, in particular sodium dodecyl sulfonate (SDS) is used. The non-ionic surfactant includes alkyl phenol polyethylene oxide ether and aliphatic alcohol polyethylene oxide ether. Preferably, alkyl phenol polyethylene oxide ether is used. In a specific embodiment, octyl phenol polyethylene oxide ether (OP-10) is used.

For the preparation of an aqueous latex according to the present disclosure, the amounts of emulsifier and initiator and as well the reaction conditions such as the reaction temperature, the speed of stirring, and so on can be empirically determined by a person skilled in the art.

Dispersion of Inorganic Pigment Particles

In still another aspect of the present disclosure, there is provided a dispersion of inorganic pigment particles comprising an aqueous latex as described herein, and as well use of the aqueous latex for spacing inorganic pigment particles. In the context of the present disclosure, the phrase "a dispersion of inorganic pigment particles" refers to a composition of matter obtained by dispersing inorganic pigment particles in a dispersion medium.

In an embodiment of the present disclosure, the dispersion of inorganic pigment particles comprises an aqueous latex as described above, inorganic pigment particles, a dispersion medium, and optionally additional additives, wherein the aqueous latex serves as a spacing extender for the inorganic pigment particles.

In the dispersion of inorganic pigment particles, the amount of the aqueous latex serving as a spacing extender may vary depending on the total weight of the inorganic pigment particles used. Preferably, the amount of the aqueous latex is, relative to the total weight of the inorganic pigment particles, in the range of from 10 to 50% by weight.

As used herein, the phrase "inorganic pigment particles" refer to any pigment material which is substantially insoluble in a dispersion medium at the temperature concerned, and which it is desired to stabilize in a finely divided form in the dispersion medium. The inorganic pigment particles may be in shape of sphere, fiber, flake, or other regular or irregular shapes of micrometric or even nanometric size.

In an embodiment of the present disclosure, suitable examples of the inorganic pigment particles include metal oxides, such as titanium dioxide, iron oxides, zinc oxide, zirconia, or aluminia; metal composite oxides containing two or more metal elements including manganese, nickel, titanium, chromium, antimony, magnesium, cobalt, iron, or aluminum; oxymetallic compounds, such as bismuth vanadate, cobalt aluminate, cobalat zincate, or zinc chromate; metallic pigments, such as aluminum flake, copper, and copper-zinc alloys; and pearlescent pigments, such as lead carbonate and bismuth oxychloride. It is preferable that the inorganic pigment particles are titanium dioxide particles, preferably titanium dioxide particles in the form of slurry or powder.

As used herein, the term "dispersion medium" refers to a medium in which the inorganic pigment particles are dispersed, preferably an aqueous medium, including, but not limited to water, an organic solvent miscible with water, or a mixture thereof. Examples of the organic solvent miscible with water include lower alcohols, such as methanol, ethanol, propanol, and butanol; ketones, such as acetone, methyl ethyl ketone, and methyl propyl ketone; amides, such as dimethyl formamide and dimethyl acetamide; furans, such as tetrahydrofuran, or a combination thereof.

In an embodiment where titanium dioxide particles are used as the inorganic pigment particles, the titanium dioxide particles are dispersed in a first aqueous dispersion medium to provide a slurry. This step may be carried out by a provider of titanium dioxide. Next, the slurry of the inorganic pigment particles is mixed with the aqueous latex as described herein and a second aqueous dispersion medium to form a desired dispersion of the inorganic pigment particles. The first and second aqueous dispersion media may be the same or different. Preferably, the first and second aqueous dispersion media are the same or have the similar polarity. In an alternative embodiment where titanium dioxide particles are used as the inorganic pigment particles, the titanium dioxide particles in the form of dry powder are directly mixed with the aqueous latex as described herein and an aqueous dispersion medium to form a desired dispersion of titanium dioxide particles.

The dispersion of inorganic pigment particles may further comprise one or more additional additives. Suitable examples of the additional additives include a surface active agent, an antifoaming agent, a rheology modifying agent, a thermal stabilizer, a flow/leveling agent, a matting agent, an anti-sedimentation agent, a biocide, and a combination thereof.

In a dispersion of inorganic pigment particles according to the present disclosure, the amount of inorganic pigment particles, the type and amount of a dispersion medium, and the types and amounts of additional additives can be empirically determined by a person skilled the art as desired.

The dispersion of inorganic pigment particles as disclosed herein can be used directly as such or can be used to formulate coating compositions.

The dispersion of inorganic pigment particles thus formulated in the presence of the aqueous latex as disclosed herein exhibits an improved stability, especially an improved stability of viscosity. In particular, the viscosity of the dispersion of inorganic pigment particles increases by less than 5%, preferably less than 2%, and more preferably less than 1% after storage at 50° C. for at least one month or even three months.

Aqueous Coating Composition

In yet still another aspect of the present disclosure, there is provided an aqueous coating composition comprising water, a film-forming amount of a film-forming resin, inorganic pigment particles, a spacing extender for the inorganic pigment particles; and conventional additives, wherein the spacing extender is an aqueous latex according to the present disclosure.

As used herein, the term "a film-forming resin" refers to any aqueous latex commonly used to carry out the film-formation in the field of coating. The film-forming resins commonly used include aqueous latexes of organic silicones, styrene-acrylates, acrylates, organic silicones modified acrylates, vinyl acetate, vinyl acetate-acrylates, vinyl acetate-ethylene, ethylene-vinyl acetate, vinyl acetate-acrylates-ester of versatic acid (e.g., vinyl ester of versatic acid, VeoVa™ 10), or fluorocarbon polymer, or any combination thereof.

An aqueous latex useful as the film-forming resin of the aqueous coating composition may be prepared by any suitable process for the preparation of an aqueous latex that is well-known to a person skilled in the art, as described above. Alternatively, as a specific example of the film-forming resin, any suitable product commercially available, such as the aqueous latex of styrene-acrylates available from BATF Industry Co., Ltd. under the trade name of RS 998A, RS 968 or RS 936W, may be used.

As can be readily appreciated by a person skilled in the art, the aqueous coating composition comprises the film-forming resin in a film-forming amount. Preferably, the amount of the film-forming resin comprised by the aqueous coating composition is in the range of from about 5 to 50% by weight relative to the total weight of the aqueous coating composition. Preferably, the amount of the film-forming resin comprised by the aqueous coating composition is at least about 10%, more preferably at least about 15%, and even more preferably about 20% by weight relative to the total weight of the aqueous coating composition. Preferably, the amount of the film-forming resin comprised by the aqueous coating composition is up to about 45%, more preferably up to about 40%, and even more preferably about 30% by weight relative to the total amount of the aqueous coating composition.

Additional water may be added in formulating the aqueous coating composition to adjust the viscosity of the aqueous coating composition. The amount of water added may vary depending on the desirable viscosity and processability of the aqueous coating composition. Preferably, the amount of water added is, relative to the total weight of the aqueous coating composition, in the range of from about 10 to 50% by weight, preferably from 15 to 40% by weight.

For the aqueous coating composition according to the present disclosure, all the description and examples of the inorganic pigment particles and the spacing extender as described above can apply.

In the aqueous coating composition according to the present disclosure, the amount of inorganic pigment particles is in the range of from about 5 to 30%, preferably from 10 to 20%, and more preferably from 10 to 17% by weight relative to the total weight of the aqueous coating composition.

In the aqueous coating composition according to the present disclosure, the amount of the spacing extender for inorganic pigment particles is in the range of from about 1 to 10%, and preferably from 2 to 10% by weight relative to the total weight of the aqueous coating composition. In order to meet the requirement for spacing inorganic pigment particles, the amount of the spacing extender desirably varies depending on the total weight of the inorganic pigment particles. Preferably, the amount of the spacing extender is in the range of from 10 to 50% by weight relative to the total weight of inorganic pigment particles.

The coating formed from the aqueous coating composition according to the present disclosure that comprises the aqueous latex as disclosed herein acting as a spacing extender for inorganic pigment particles exhibits higher opacity and/or lower b value at the same amount of inorganic pigment particles, or exhibits substantially the same or even higher opacity and/or the same or even lower b value at a lower amount of inorganic pigment particles, as compared with a coating formed from a comparable coating composition that does not, however, contain the aqueous latex according to the present disclosure.

Surprisingly it has been found that with the aqueous latex as disclosed herein added as an spacing extender for inorganic pigment particles in an aqueous coating composition comprising such inorganic pigment particles (especially titanium dioxide particles), the coating formed from such an aqueous coating composition may still obtain a comparable opacity and b value even at an amount of inorganic pigment particles reduced by 5 to 20% by weight.

Additionally, the aqueous coating composition comprising the aqueous latex as disclosed herein exhibits the improved stability of viscosity. In particular, the viscosity of the aqueous coating composition according to the present disclosure increases by less than 5%, preferably less than 2%, and more preferably less than 1%, after storage at 50° C. for at least one month or even three months.

The aqueous coating composition may further comprise one or more conventional additives that do not adversely affect the coating composition or coating obtained therefrom. Suitable additives include, for example, those that can be used to improve the processability or manufacturability of the composition, enhance composition aesthetics, improve a particular functional property or characteristic of the coating composition or the cured composition resulting therefrom, such as adhesion to a substrate, or reduce the cost of production. Suitable examples of the additive include fillers, anti-migration aids, anti-microbials, lubricants, coalescent agents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, thickeners, pH adjusters, solvents, or combinations thereof. Each optional ingredient can be included in a sufficient amount to serve its intended purpose, but preferably not in such an amount to adversely affect the coating composition or cured coating obtained therefrom. In a preferred embodiment, the aqueous coating composition according to the present disclosure may comprise a thickener, a dispersant, a defoamer, a wetting agent, a pH adjuster, filler, a coalescent agent, a bactericide, a fungicide, or any combination thereof. According to the present disclosure, the total amount of the conventional additives is in the range of from about 0.1 to 74% by weight relative to the total weight of the aqueous coating composition.

In an embodiment of the present disclosure, the aqueous coating composition comprises, relative to the total weight of the aqueous coating composition,
  15 to 40% by weight of water,
  5 to 30% by weight of the film-forming resin,
  5 to 30% by weight of the inorganic pigment particles,
  1 to 10% by weight of the spacing extender for inorganic pigment particles, and
  0.1 to 74% by weight of the conventional additives.

In a specific embodiment of the present disclosure, the aqueous coating composition comprises, relative to the total weight of the aqueous coating composition,
  15 to 40% by weight of water,
  5 to 30% by weight of the film-forming resin,
  5 to 30% by weight of the inorganic pigment particles,
  1 to 10% by weight of the spacing extender for inorganic pigment particles,
  10 to 60% by weigh of the filler,
  0.03 to 0.5% by weight of the thickener,
  0.05 to 0.5% by weight of the dispersant,
  0.05 to 0.5% by weight of the defoamer,
  0.05 to 0.5% by weight of the wetting agent,
  0.05 to 0.5% by weight of the pH adjuster,
  1 to 10% by weight of the coalescent agent,
  0.05 to 0.2% by weight of the bactericide, and
  0.05 to 0.2% by weight of the fungicide.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available, and used directly as they were originally received.

Measurement Method

Glass transition temperature (Tg) was measured by using the differential scanning calorimetry (DSC). The measurement procedure was outlined as follows: drying aqueous latex to be analyzed to form a film; taking and weighing a sample of 5 to 10 mg from the dried film; and heating the sample in a differential scanning calorimeter from −20° C. to 200° C. at a rate of 10° C./min under a nitrogen gas atmosphere of 40 mL/min.

Minimum film formation temperature MFFT was measured according to ASTM D-2354-91.

Opacity and b value were measured by using a color spectrophotometer from BYK-Gardner GmbH, Germany.

Number-average particle size was measured by using Hitachi SU9000 High Resolution Scanning Electron Microscope. The measurement procedure was outlined as follows: coating aqueous latex to be analyzed onto a PET film; air drying at room temperature; treating the sample with metal sputtering; and then determining the particle size of at least ten polymeric particles by the Scanning Electron Microscope and calculating the number-average particle size.

Viscosity of aqueous coating compositions was measured by using Stormer Viscometer at a rotor speed of 200 r/min.

Example 1

Preparation of Ethylenically Unsaturated Monomer i)

Ethylenically Unsaturated Monomer i)-1

Under the protection of $N_2$, allyl polyethylene oxide ether and phosphorus pentoxide at a molar ratio of 1:1.2 along with 500 ppm polymerization inhibitor were loaded into a four-necked flask equipped with a thermometer, an overhead stirrer, a gas inlet and a condenser, and then homogenized. The reaction mixture was allowed to react at 65° C. for 5 hours. Then some water was added as appropriate, and the reaction was allowed to proceed at 65° C. for a further 1 hour. Finally the reaction mixture was neutralized with sodium hydroxide at 25° C. so as to obtain the ethylenically unsaturated monomer i)-1.

Ethylenically Unsaturated Monomer i)-2

The ethylenically unsaturated monomer i)-2 was prepared according to the similar procedure for the preparation of the ethylenically unsaturated monomer i)-1, expect that polyethylene glycol acrylate monoester was used in place of allyl polyethylene oxide.

Ethylenically Unsaturated Monomer i)-3

Under the protection of $N_2$, allyl polyethylene oxide ether and ethyl glycinate hydrochloride at a molar ratio of 1:1 along with a catalytic amount of p-toluene sulfonic acid, 500 ppm polymerization inhibitor, and some ethanol as appropriated were loaded into a four-necked flask equipped with a thermometer, an overhead stirrer, a gas inlet and a condenser, and then homogenized. The reaction mixture was allowed to reflux for 2 hours. Then the reaction mixture was neutralized with sodium hydroxide at 25° C. so as to obtain the ethylenically unsaturated monomer i)-3.

Ethylenically Unsaturated Monomer i)-4

The ethylenically unsaturated monomer i)-4 was prepared according to the similar procedure for the preparation of the ethylenically unsaturated monomer i)-3, expect that polyethylene glycol acrylate monoester was used in place of allyl polyethylene oxide.

Example 2

Preparation of Aqueous Latex 2 g of any one of the ethylenically unsaturated monomers as prepared in Example 1, 500 g of styrene, 45 g of butyl acrylate, and 5 g of acrylic acid were mixed to be homogeneous to provide a monomer mixture. 6 g of sodium dodecyl sulfonate SDS and 3 g of octyl phenol polyethylene oxide ether (OP-10) were dissolved in 250 g of water, to which the monomer mixture was then added under stirring to provide a pre-emulsion. To a reaction flask, 350 g of deioned water, 1 g of SDS, 0.5 g of OP-10, and 0.2 g of ammonium persulfate were added, homogenized under stirring, and then heated to 80° C. At this predetermined temperature, the pre-emulsion was added dropwise to the contents of the reaction flask in 2 hours. After the addition of the pre-emulsion was completed, the reaction mixture continued to stay at 80° C. for 1.5 hours. Finally, the latex obtained as the reaction product in the flask was cooled down, and adjusted to a pH between 7.0 and 8.5. After measurement, the polymeric particles of the aqueous latex prepared from the monomer mixture comprising the ethylenically unsaturated monomer i)-1 or 2 have a Tg of 74.7° C., and a number-average particle size of about 60 nm, as illustrated in FIG. 1. Furthermore, it was determined that the aqueous latexes thus prepared could not form a film at 60° C.

Example 3

Aqueous Coating Composition

The aqueous latexes as prepared in Example 2 above were respectively mixed with water, $TiO_2$, a film-forming resin, and conventional additives (including cellulose, a defoamer, a dispersant, a wetting agent, a pH adjuster, filler, a coalescent agent, bactericide, and fungicide) to formulate the coating compositions. The formulation of the coating composition was shown in Table 1.

TABLE 1

Formulation of Coating Composition

| Ingredients | Amount | Source |
|---|---|---|
| Water | 15 to 40 wt % | |
| Cellulose | 0.03 to 0.5 wt % | commercially available |
| Defoamer | 0.05 to 0.5 wt % | commercially available |
| Dispersant | 0.05 to 0.5 wt % | commercially available |
| Wetting agent | 0.05 to 0.5 wt % | commercially available |
| PH adjuster | 0.05 to 0.5 wt % | commercially available |
| $TiO_2$ | 5 to 30 wt % | commercially available |
| Filler | 10 to 60 wt % | commercially available |
| Film-forming resin | 5 to 30 wt % | commercially available |
| Aqueous latex prepared in Example 2 | 1 to 10 wt % | commercially available |
| Coalescent agent | 0.05 to 0.2 wt % | commercially available |
| Bactericide | 0.05 to 0.2 wt % | commercially available |
| Fungicide | 0.05 to 0.2 wt % | commercially available |

The aqueous coating composition thus formulated was stored under the conditions of a temperature of 50° C. and a relative humidity of 50 to 70%, and the viscosity was measured after storage for 0, 15, 30, 45, 60, 75, and 90 days, respectively. The results were shown in Table 2.

TABLE 2

Change in Viscosity of Coating Composition over Time

| Time (in day) | 0 | 15 | 30 | 45 | 60 | 75 | 90 |
|---|---|---|---|---|---|---|---|
| Viscosity (in Ku) | 98.1 | 99.4 | 97.7 | 97.8 | 99.3 | 100.4 | 98.6 |

It was shown in Table 2 that the viscosity of the coating composition maintained substantially stable, i.e., increased by less than 1%, after storage at 50° C. for three months.

To demonstrate the spacing effects of the aqueous latex with Ethylenically Unsaturated Monomer i)-1 as prepared in Example 2 on inorganic pigment particles, $TiO_2$ particles from different sources were used: $TiO_2$ powder under trade name R-706 from DuPont; $TiO_2$ powder under trade name R-298 from Pangang Group Steel Co., Ltd, China; $TiO_2$ powder under trade name SR-237 from Shandong Dongjia Group Co., Ltd, China; and $TiO_2$ powder under trade name R-838 from BlueStar Group (CHINA) Co., Ltd, China.

FIG. 2 showed the photograph of the dispersion of $TiO_2$ particles (R-706 from DuPont) spaced with the aqueous latex as prepared in Example 2. It can be seen in the SEM photograph of FIG. 2 that the aqueous latex served as the spacing extender to space the $TiO_2$ particles, thus preventing the $TiO_2$ particles from aggregation and rendering better dispersibility of the $TiO_2$ particles in a dispersion medium.

In the experiments and comparative experiments indicated in Table 3 below, the formulations of the compositions were substantially the same, except that the aqueous latex with Ethylenically Unsaturated Monomer i)-1 as prepared in Example 2 was used for the experiments, while a comparable amount of the film-forming resin commercially available was used in place of the aqueous latex for the examples, and that the amount of $TiO_2$ used in the experiments was 16.19% by weight, in comparison with 19.07% of $TiO_2$ used in the comparative experiments. The thus-formulated coating compositions were dried to form a coating, and the opacity and b value of the coatings were compared, respectively. The results were shown in Table 3 and FIG. 3.

TABLE 3

Comparison of Optical Properties of Coatings

| No. | $TiO_2$ | Amount of $TiO_2$ | Opacity | b-value |
|---|---|---|---|---|
| Experiment 1 | R-706 | 16.19% | 97.59% | 1.62 |
| Com. Ex A | R-706 | 19.07% | 96.72% | 1.68 |
| Experiment 2 | R-298 | 16.19% | 97.87% | 2.33 |
| Com. Ex B | R-298 | 19.07% | 97.74% | 2.43 |
| Experiment 3 | SR-237 | 16.19% | 97.82% | 2.50 |
| Com. Ex C | SR-237 | 19.07% | 97.85% | 2.69 |
| Experiment 4 | R-838 | 16.19% | 97.94% | 1.88 |
| Com. Ex D | R-838 | 19.07% | 98.00% | 1.89 |

FIG. 3 showed the photographs of the coatings according to the experiments and the comparative experiments taken by a BYK spectrometer, with the left side of each photograph taken from the comparative experiment and right side of each photograph from the experiments. Observed by naked eyes, the photographs shown in FIGS. 3a) to 3d) of the respective coatings of the experiments ($TiO_2$ content: 16.19%) and the respective comparative experiments ($TiO_2$ content: 19.07%) showed no perceivable differences.

The results given in Table 3 demonstrated that with the aqueous latex as prepared herein used as the spacing extender, the coatings of the experiments obtained the substantially unchanged opacity and even lower b value as compared with the comparative experiments, while the $TiO_2$ content of the experiments is less than that of the comparative experiments by 15%.

Therefore, it was clearly indicated that use of the aqueous latex as prepared herein as the spacing extender allowed the content of $TiO_2$ used to be decreased, while the resultant coating was still able to obtain the desirable optical properties, including the opacity and b value.

What is claimed is:

1. An aqueous dispersion of polymeric particles prepared through emulsion polymerization using monomers comprising:
   i) 0.1 to 20% by weight of at least one ethylenically unsaturated monomer containing an anchor functionality and a moiety containing poly(oxyethylene);
   ii) 0 to 20% by weight of at least one ethylenically unsaturated monomer with a carboxylic acid functionality; and
   iii) 60 to 99.9% by weight of at least one ethylenically unsaturated monomer other than monomers i) and ii), wherein the weight % is relative to the total weight of the monomers i), ii) and iii); and
   wherein the polymeric particles have a glass transition temperature of greater than 60° C. up to about 110° C.

2. The aqueous dispersion of polymeric particles as claimed in claim 1, wherein the polymeric particles have a number average particle size in the range of from 30 to 150 nm.

3. The aqueous dispersion of polymeric particles of claim 1, wherein the ethylenically unsaturated monomer i) has a structure represented by formula (I):

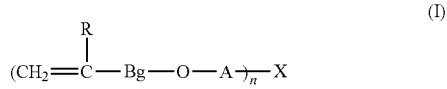

in which,
R represents H or methyl; Bg represents a divalent bridged group of —CO— or —CHR'— wherein R' represents H or methyl; A represents —$(CH_2CH_2O)_r$—, in which r represents a value in the range of 1 to 54 or —$(CH_2CH_2O)_p(C_yH_{2y}O)_q$—, in which the structural units are connected with each other in arbitrary order, the subscripts p and q represent the statistic sum of the corresponding structural units in the range of 1 to 54 with the ratio of p to q being in the range of 1:1 to 10:1 and y represents an integer in the range of 3 to 8; X represents an anchor functionality; and n is 1 or 2.

4. The aqueous dispersion of polymeric particles as claimed in claim 3, wherein the anchor functionality is selected from the group consisting of phosphoric acid functionality, phosphate salt functionality, ammonium salt functionality, amine functionality and hydroxyl functionality.

5. The aqueous dispersion of polymeric particles as claimed in claim 4, wherein the ethylenically unsaturated monomer i) has a structure represented by formula (I-1):

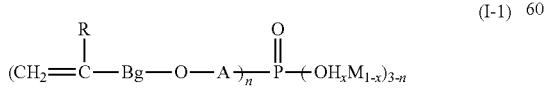

in which,
R, Bg, A and n are defined as above; M represents alkali metal ion; and x is at each occurrence 0 or 1.

6. The aqueous dispersion of polymeric particles of claim 1, wherein the ethylenically unsaturated monomer i) is present in an amount of 0.2 to 10% by weight relative to the total weight of monomers i), ii) and iii).

7. The aqueous dispersion of polymeric particles of claim 1, wherein the ethylenically unsaturated monomer ii) is selected from the group consisting of acrylic acid, methacrylic acid, beta-acryloxy propionic acid, ethacrylic acid, alpha-chloroacrylic acid, crotonic acid, alpha-phenylacrylic acid, cinnamic acid, chlorocinnamic acid, itaconic acid, maleic acid and the combination thereof.

8. The aqueous dispersion of polymeric particles as claimed in claim 7, wherein the ethylenically unsaturated monomer ii) comprises acrylic acid, methacrylic acid or the combination thereof.

9. The aqueous dispersion of polymeric particles of claim 7, wherein the ethylenically unsaturated monomer ii) is present in an amount of 0.2 to 10% by weight relative to the total weight of monomers i), ii) and iii).

10. The aqueous dispersion of polymeric particles of claim 1, wherein the ethylenically unsaturated monomer iii) is selected from the group consisting of styrene, alpha-methylstyrene, vinyltoluene, vinylnaphthalene, vinyl acetate, vinyl versarate, acrylonitrile, methacrylonitrile, $C_{1-20}$ alkyl esters of (meth)acrylic acid, alkoxyalkyl (meth)acrylate and the combination thereof.

11. The aqueous dispersion of polymeric particles as claimed in claim 10, wherein the ethylenically unsaturated monomer iii) comprises relative to the total weight of monomers i), ii) and iii), 50 to 99.9% by weight of styrene, 0 to 40% by weight of butyl acrylate and 0 to 49.9% by weight of methyl methacrylate.

12. A process for the preparation of an aqueous dispersion of polymeric particles comprising carrying out an emulsion polymerization of monomers in the presence of an emulsifier and a radical initiator, the monomers comprising:
   i) 0.1 to 20% by weight of at least one ethylenically unsaturated monomer containing an anchor functionality and a moiety containing poly(oxyethylene);
   ii) 0 to 20% by weight of at least one ethylenically unsaturated monomer with a carboxylic acid functionality; and
   iii) 60 to 99.9% by weight of at least one ethylenically unsaturated monomer other than monomers i) and ii), wherein the weight% is relative to the total weight of the monomers i), ii) and iii); and
   wherein the polymeric particles have a glass transition temperature greater than 60° C. up to about 110° C.

13. The process as claimed in claim 12, wherein the polymeric particles have a number average particle size in the range of from 30 to 150 nm.

14. The process of claim 12, wherein the ethylenically unsaturated monomer i) has a structure represented by formula (I):

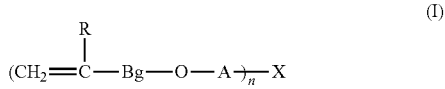

in which,
R represents H or methyl; Bg represents a divalent bridged group of —CO— or —CHR'— wherein R' represents H or methyl; A represents —$(CH_2CH_2O)_r$—, in which r represents a value in the range of 1 to 54 or —$(CH_2CH_2O)_p(C_yH_{2y}O)_q$—, in which the structural units are connected with each other in arbitrary order, the subscripts p and q represent the statistic sum of the corresponding structural units in the range of 1 to 54 with the ratio of p to q being in the range of 1:1 to 10:1 and y represents an integer in the range of 3 to 8; X represents an anchor functionality, and n is 1 or 2.

15. The process as claimed in claim 14, wherein the anchor functionality is selected from the group consisting of phosphoric acid functionality, phosphate salt functionality, ammonium salt functionality, amine functionality and hydroxyl functionality.

16. The process as claimed in claim 15, wherein the ethylenically unsaturated monomer i) has a structure represented by formula (I-1):

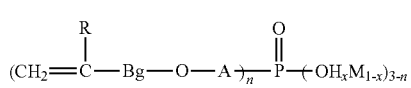

(I-1)

in which,
R, Bg, A and n are defined as above; M represents alkali metal ion; and x is at each occurrence 0 or 1.

17. The process of claim 12, wherein the ethylenically unsaturated monomer i) is present in an amount of 0.2 to 10% by weight relative to the total weight of monomers i), ii) and iii).

18. A dispersion of inorganic pigment particles comprising inorganic pigment particles, an aqueous dispersion of polymeric particles of claim 1, and a dispersion medium.

19. The dispersion of inorganic pigment particles as claimed in claim 18, wherein the inorganic pigment particles comprise titanium dioxide particles in the form of slurry or powder.

20. The dispersion of inorganic pigment particles as claimed in claim 18, wherein the dispersion medium is water, an organic solvent miscible with water or the combination thereof.

21. The process as claimed in claim 12, wherein the polymeric particles have a glass transition temperature of at least 70° C. up to about 110° C.

22. The process as claimed in claim 12, wherein the polymeric particles have a glass transition temperature of at least 80° C. up to about 105° C.

* * * * *